(12) United States Patent
Hsu

(10) Patent No.: US 6,478,630 B1
(45) Date of Patent: Nov. 12, 2002

(54) ELECTRICAL CARD CONNECTOR HAVING POLARIZATION MECHANISM

(75) Inventor: Hugh Chi Hsu, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/952,399

(22) Filed: Sep. 13, 2001

(30) Foreign Application Priority Data

Jul. 20, 2001 (TW) .................................... 090212267 U

(51) Int. Cl.⁷ .............................................. H01R 13/64
(52) U.S. Cl. ...................................... 439/680; 439/607
(58) Field of Search ................................ 439/630, 607, 439/609, 159, 680

(56) References Cited

U.S. PATENT DOCUMENTS 5,267,882 A * 12/1993 Davis .......................... 439/680
6,068,516 A * 5/2000 Chang ......................... 439/633
6,109,969 A * 8/2000 Kuo et al. .................... 439/610

* cited by examiner

Primary Examiner—Gary Paumen
(74) Attorney, Agent, or Firm—Wei Te Chung

(57) ABSTRACT

An electrical card connector (1) includes an insulative body (10), contacts (11) mounted in the insulative body, a shell (14) covering the insulative body and the contacts, and a polarization mechanism (145). The polarization mechanism is formed with the shell and includes an elastic portion (147) and a stop (148). The polarization mechanism prevents an electrical card (2) from being incorrectly inserted into the connector. When the card is correctly inserted into the connector front end first, the stop is moved by the elastic portion away from a path of the card. When the card is incorrectly inserted into the connector rear end first, the stop prevents the card from being fully inserted into the connector.

16 Claims, 5 Drawing Sheets

ELECTRICAL CARD CONNECTOR HAVING POLARIZATION MECHANISM

BACKGROUND OF THE INVENTION

1. Field of the Invention

The present invention relates to electrical card connectors electrically connecting electrical cards with printed circuit boards, and particularly to card connectors having polarization mechanisms to prevent cards from being incorrectly inserted into the card connectors.

2. Related Art of the Invention

With ongoing developments in electronics and communications, more and more electrical cards are being designed to satisfy all kinds of needs. As a result, different kinds of electrical card connectors are being developed. Most card connectors have a polarization mechanism to make sure that cards are correctly inserted into the card connectors. If the cards are incorrectly inserted, the polarization mechanisms prevent the cards from being fully inserted. Therefore contacts of the card connectors are protected from being damaged by incorrectly inserted cards. A pertinent card connector is disclosed in Japanese Patent Application No. 11-66247 by Kokai.

The polarization mechanism of the Kokai patent application can prevent the card from being mistakenly inserted upside down. However, a card must also be correctly inserted front end first. The polarization mechanism of the Kokai patent application does not prevent the card from being mistakenly inserted rear end first.

Accordingly, it is desired to have an improved electrical connector that not only prevents a card from being mistakenly inserted upside down, but also prevents the card from being mistakenly inserted rear end first. U.S. Pat. No. 6,068,516 having the same assignee with the instant invention, discloses an approach to achieve the anti-disorientation function, and the invention is an improvement thereupon.

SUMMARY OF THE INVENTION

An object of the present invention is to provide an electrical card connector insuring that an electrical card can be inserted thereinto correctly.

Another object of the present invention is to provide an electrical card connector firmly mating with an electrical card to insure reliable mechanical and electrical coupling therebetween.

To accomplish the above-mentioned objects, an electrical card connector according to the present invention comprises an insulative body, contacts mounted in the insulative body, a shell covering the insulative body and the contacts, and a polarization mechanism. The polarization mechanism is formed with the shell and includes an elastic portion and a stop. The polarization mechanism prevents an electrical card from being incorrectly inserted into the connector. When the card is correctly inserted into the connector front end first, the stop is moved by the elastic portion away from a path of the card. When the card is incorrectly inserted into the connector rear end first, the stop prevents the card from being fully inserted into the connector.

Further objects and advantages of the present invention will become more apparent from a consideration of the drawings and the ensuing detailed description.

BRIEF DESCRIPTION OF THE INVENTION

DETAIL DESCRIPTION OF THE INVENTION

Figure 1:
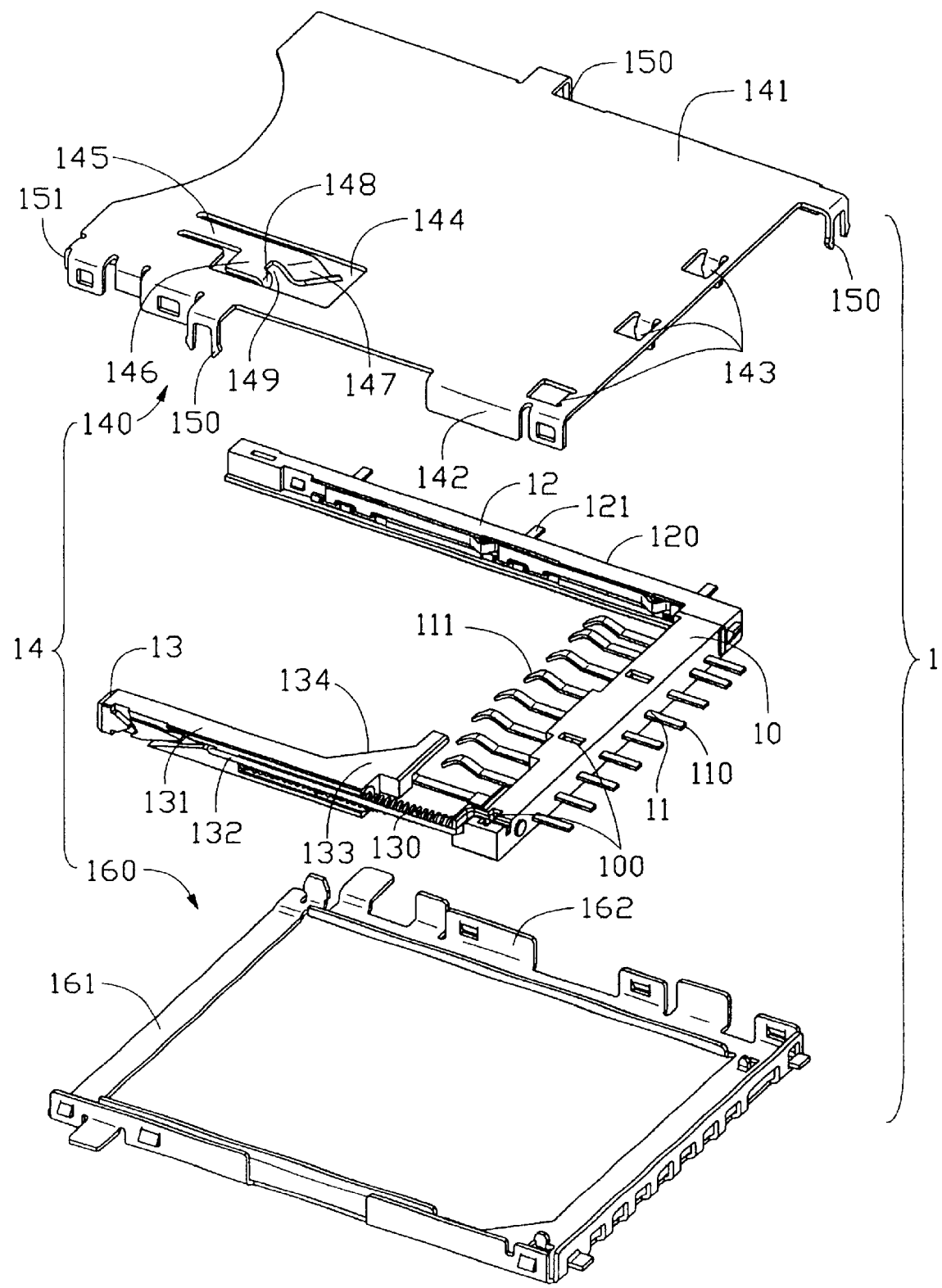
FIG. 1 is an exploded perspective view of an electrical card connector in accordance with the present invention.

Referring to FIG. 1, an electrical card connector 1 in accordance with the present invention comprises an insulative body 10, contacts 11 integrally mounted in the insulative body 10, a switching module 12, an ejecting mechanism 13, and a shell 14. The shell 14 covers the insulative body 10, contacts 11, switching module 12, and ejecting mechanism 13.

A plurality of retaining grooves 100 is defined in a top surface of the insulative body 10. Each contact 11 includes a soldering portion 110 protruding outwardly from the insulative body 10, and an opposite contact portion 111 disposed inwardly from the insulative body 10. The soldering portions 110 are for being soldered to a printed circuit board (not shown).

The switching module 12 is connected with an end of the insulative body 10. The switching module 12 includes an insulative arm 120, and switching contacts 121 mounted in the insulative arm 120.

The ejecting mechanism 13 is connected with an opposite end of the insulative body 10. The ejecting mechanism 13 includes a spring 130, a push arm 131 and a connecting rod 132. An interfering block 133 is inwardly formed from an end of the push arm 131 proximate the insulative body 10. The interfering block 133 has a bevel face 134 at an inner side thereof.

Figure 2:
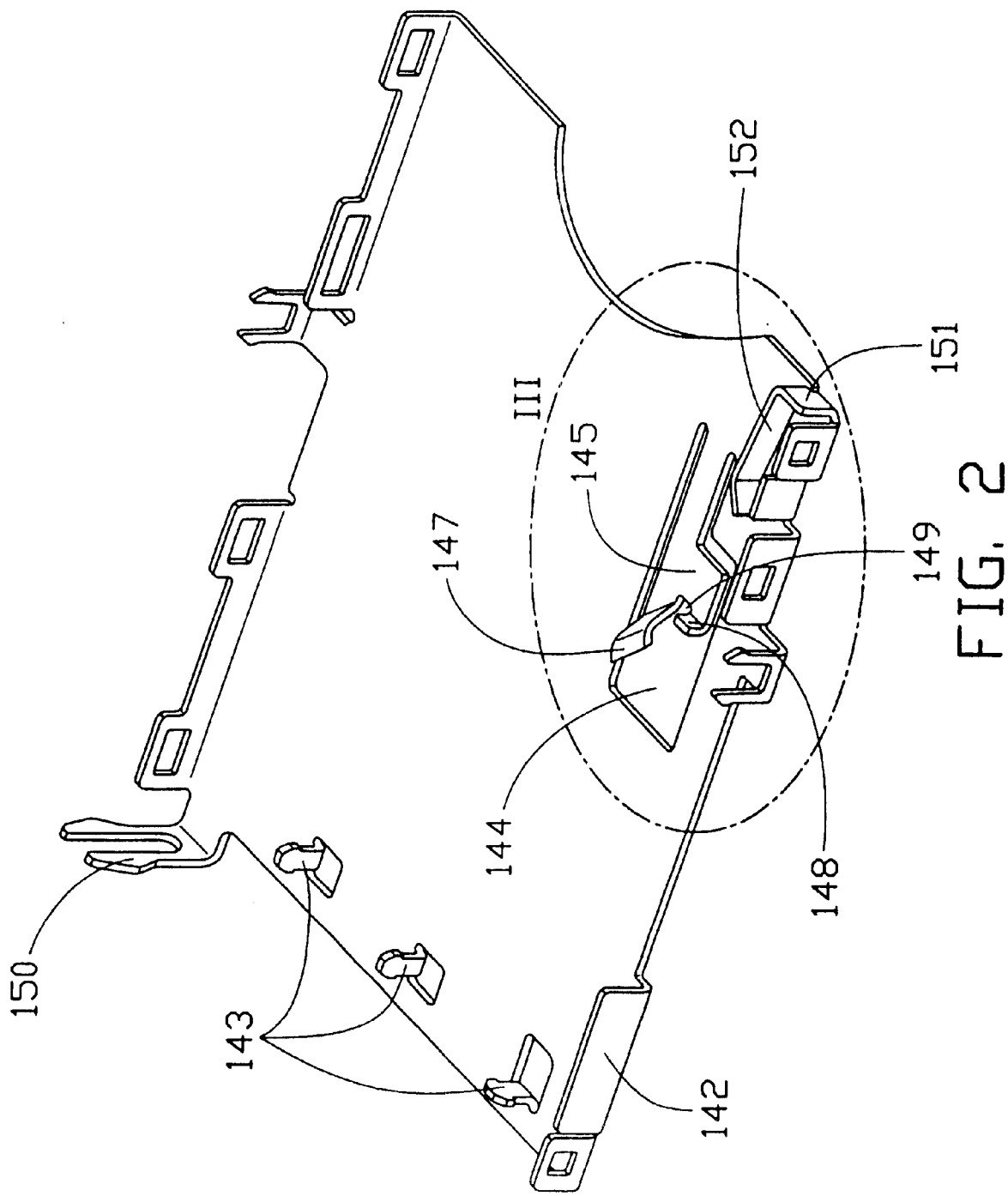
FIG. 2 is a perspective view of an upper cover of the electrical card connector of FIG. 1 that has been inverted.
Figure 3:
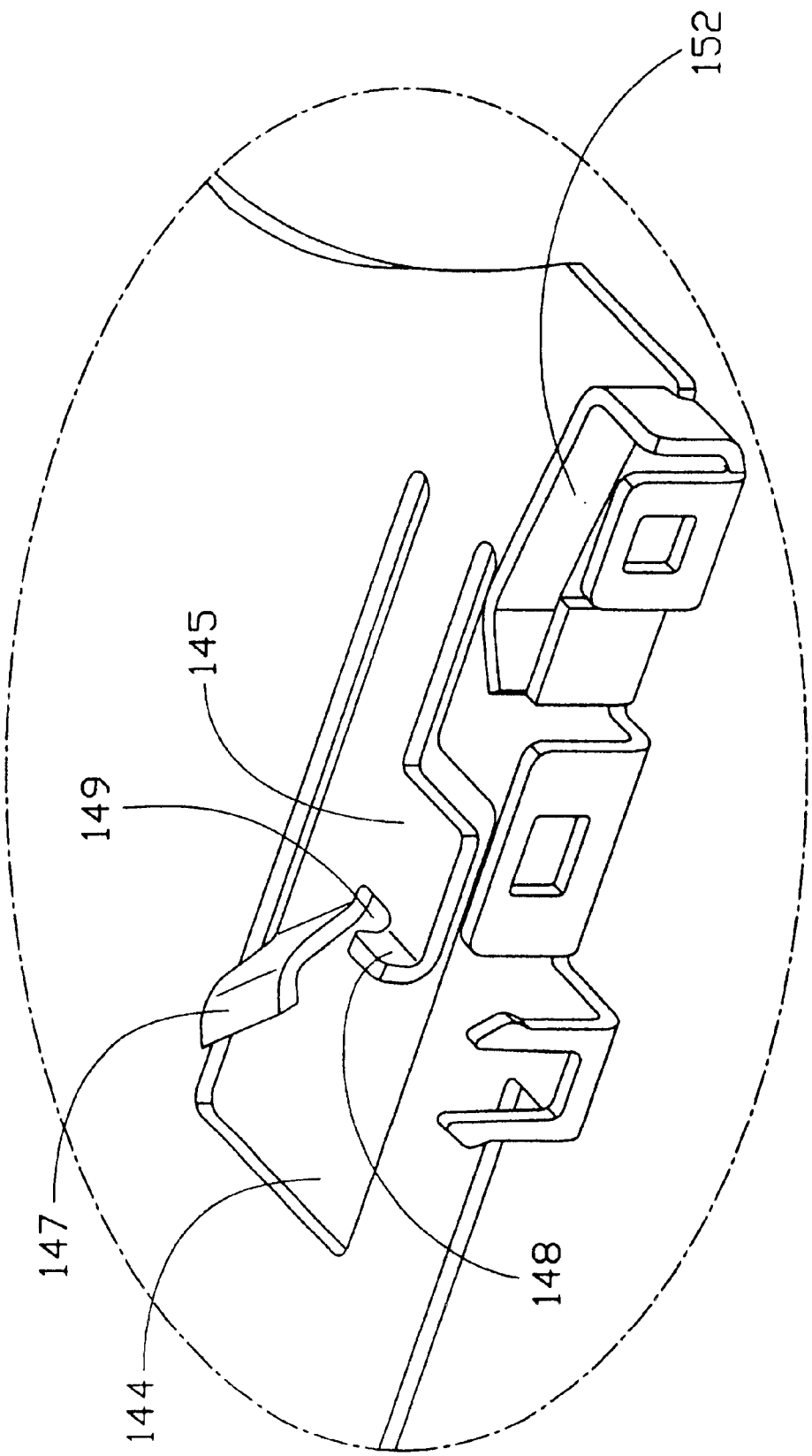
FIG. 3 is an enlarged view of that portion of FIG. 2 encircled by the line III.

Referring to FIGS. 2 and 3, the shell 14 includes an upper cover 140 and a lower cover 160. The upper cover 140 has a top wall 141, and a pair of side walls 142 respectively depending from opposite side edges of the top wall 141 near a rear of the upper cover 140. A plurality of retainers 143 depends from near a rear edge of the upper cover 140, for being fittingly received in the retaining grooves 100 of the insulative body 10.

An opening 144 is defined in the top wall 141 proximate a front corner thereof (see FIG. 1). A polarization mechanism 145 is integrally formed with the top wall 141, and extends into the opening 144. The polarization mechanism 145 includes a connecting arm 146 extending coplanarly from the top wall 141, an elastic portion 147, and a stop 148. The elastic portion 147 and the stop 148 depend from a free end of the connecting arm 146, and protrude beyond a lower surface of the top wall 141. The elastic portion 147 has an arcuate profile. A cutout 149 is defined between the elastic portion 147 and the stop 148, for increasing resiliency of the elastic portion 147.

A guiding portion 151 depends from a front corner of the top wall 141 proximate the opening 144, for guiding an electrical card 2 (see FIG. 4) being inserted into the connector 1. A spring tab 152 extends perpendicularly inwardly from an inner end of the guiding portion 151, for abutting a lateral side of an inserted card 2.

Three retaining feet 150 depend from the top wall 141, at a rear end and at opposite lateral sides respectively of the top wall 141. The retaining feet 150 are fittingly received in corresponding positioning apertures defined in the printed circuit board (not shown), for securing the connector 1 to the printed circuit board.

The lower cover 160 of the shell 14 includes a bottom wall 161 and a pair of lateral walls 162 perpendicularly bent upwardly from opposite lateral edges of the bottom wall 161 respectively.

In assembly, the insulative body 10 with the contacts 11, the switching module 12 and the ejecting mechanism 13 are placed on the bottom wall 161 of the lower cover 160 of the shell 14. Then the top wall 141 of the upper cover 160 of the shell 14 is attached to the bottom wall 161 to cover the insulative body 10 with the contacts 11, the switching module 12 and the ejecting mechanism 13. The retainers 143 of the upper cover 140 are engagingly received in the retaining grooves 100 of the insulative body 10. A receiving space (not labeled) is thereby defined between the top and bottom walls 141, the contacts 11, the switching module 12 and the ejecting mechanism 13, for receiving the inserted card 2 (see FIG. 4) through an open end of the connector 1. The elastic portion 147 and the stop 148 of the polarization mechanism 145 project into the receiving space.

Figure 4:
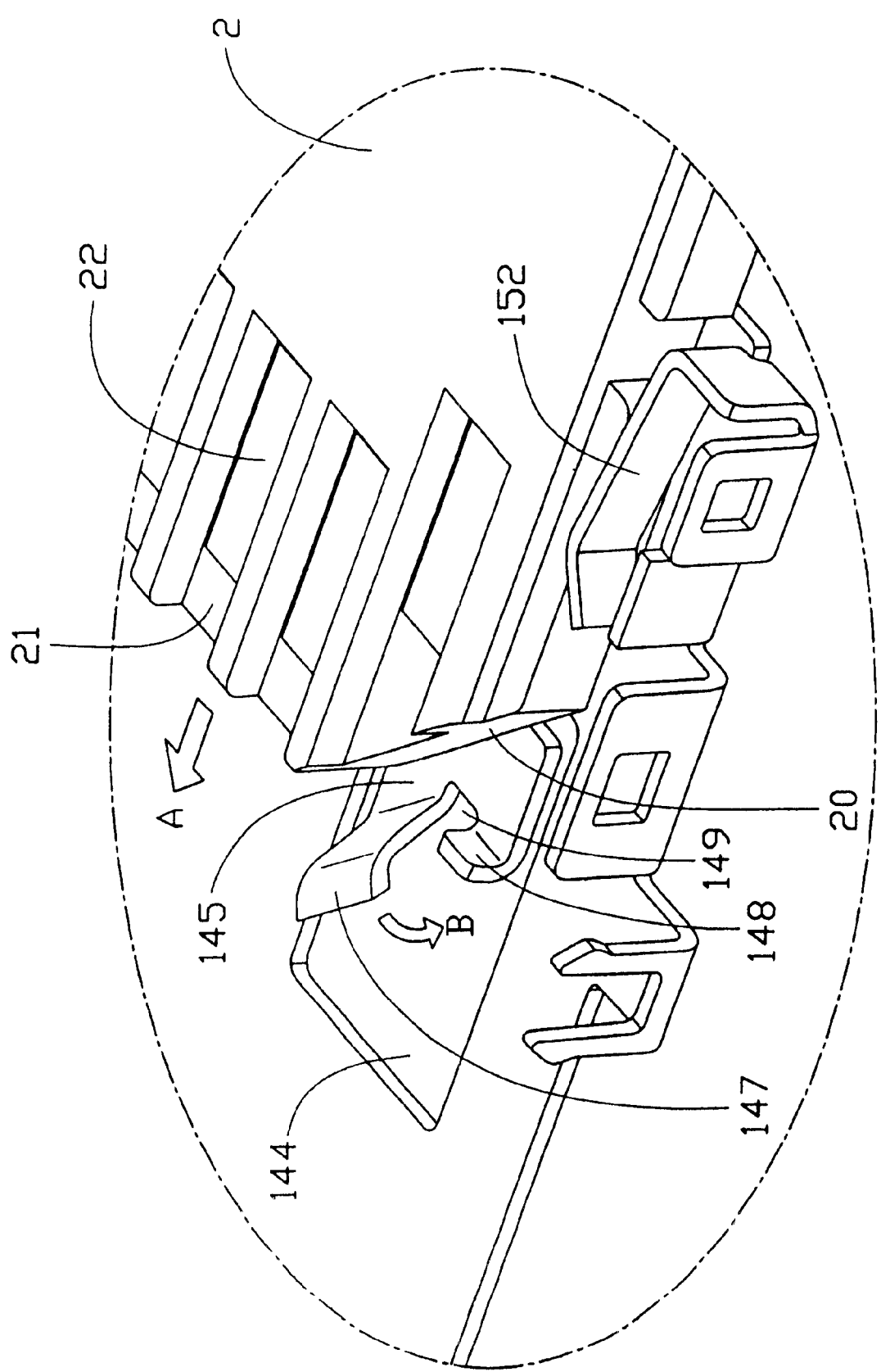
FIG. 4 is similar to FIG. 3, but showing an electrical card being correctly inserted into the electrical card connector.
Figure 5:
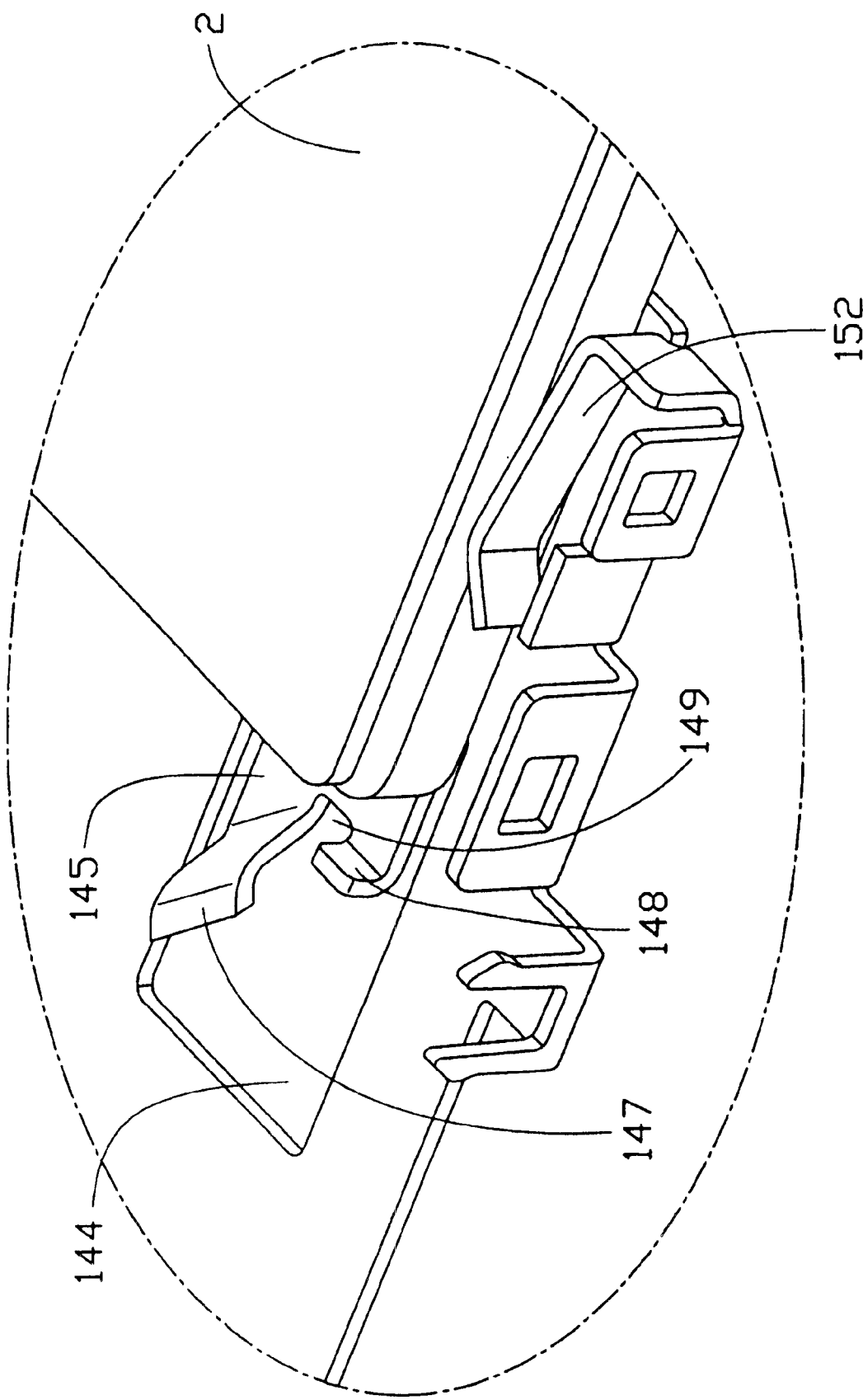
FIG. 5 is similar to FIG. 3, but showing an electrical card being wrongly inserted into the electrical card connector.

Referring to FIGS. 4 and 5, the card 2 for use with the connector 1 includes a front end having a bevel edge 20 at a corner thereof and a rear end having no bevel edge. A plurality of parallel spaced recesses 21 is defined in a bottom face of the card 2 at the front end thereof. A contact pad 22 is fixed in each recess 21, for electrically engaging with the contacts 11 of the connector 1 when the card 2 is fully inserted into the connector 1.

FIG. 4 shows the card 2 being correctly inserted into the connector 1. The card 2 is inserted in direction A front end first. The bevel edge 20 of the card 2 contacts the elastic portion 147 of the polarization mechanism 145. The bevel edge 20 then presses the elastic portion 147 away from the card 2, so that the whole polarization mechanism 145 rotatingly moves away from a path of the card 2 in the direction of arrow B. This causes the stop 148 to exit the receiving space before the bevel edge 20 can reach the stop 148. Thus the card 2 can be fully inserted into the receiving space of the connector 1. The contact pads 22 of the card 2 electrically engage with the contact portions 111 of the contacts 11 of the connector 1.

FIG. 5 shows the card 2 being wrongly inserted into the connector 1. The card 2 is inserted rear end first. The rear end of the card 2 abuts against the stop 148. The card 2 is thus prevented from being fully inserted into the receiving space of the connector 1. The card 2 does not reach the contacts 11, and the contacts 11 are protected from accidental damage.

The connector 1 prevents the contacts 11 from being damaged by incorrect insertion of the card 2 rear end first. Furthermore, when the card 2 is correctly and fully inserted, the polarization mechanism 145 exerts resilient pressing force against the card 2. Thus normal contacting force between the contacts 11 and the contact pads 22 is increased, to ensure reliable electrical connection between the connector 1 and the card 2. Moreover, the polarization mechanism 145 is easily formed by stamping of the upper cover 140. Therefore the polarization mechanism 145 can be very economically manufactured.

While the present invention has been described with reference to a specific embodiment thereof, the description is illustrative and is not to be construed as limiting the invention. It is apparent that various changes may be made in the form, construction, and arrangement of parts of the embodiment without departing from the spirit or scope of the invention and its material advantages.

I claim:

1. An electrical card connector comprising:
   an insulative body;
   a plurality of contacts mounted in the insulative body;
   a metal shell covering the insulative body and the contacts, thereby defining a receiving space to receive an electrical card inserted into the connector through an open end of the connector; and
   a polarization mechanism formed with the shell and including an elastic portion, a stop and a cutout defined between the elastic portion and the stop, wherein the elastic portion has an arcuate profile and the stop projects into the receiving space, the stop being movable out of the receiving space when the elastic portion is engaged with the card correctly inserted into the connector, and the stop preventing the card from being fully inserted into the connector when the card is incorrectly inserted into the connector.

2. The electrical card connector as claimed in claim 1, wherein the shell defines an opening, and the polarization mechanism is integrally formed from the shell and disposed in the opening.

3. The electrical card connector as claimed in claim 2, wherein the polarization mechanism further includes a connecting arm integrally formed with the shell, and the elastic portion and the stop extend from a free end of the connecting arm.

4. The electrical card connector as claimed in claim 1, wherein the shell includes an upper cover and a lower cover, the polarization mechanism is integrally formed from the upper cover with the stop and the elastic portion depending into the receiving space, and the contacts are adapted to electrically engage with contact pads on a bottom face of the card.

5. The electrical card connector as claimed in claim 1, wherein the polarization mechanism exerts resilient pressing force against the card when the card has been correctly inserted into the connector, whereby reliable electrical connection between the contacts of the connector and the card is ensured.

6. The electrical card connector as claimed in claim 1, wherein the polarization mechanism is formed by stamping of the shell.

7. An electrical card connector adapted to receive an electrical card, the electrical card having a bevel edge at one corner of a front end thereof and having a plurality of contact pads at the front end thereof, the electrical card connector comprising: an insulative body;
   a plurality of contacts mounted in the insulative body, the contacts being adapted to electrically engage with the contact pads of the card;
   a metal shell covering the insulative body and the contacts, the shell having an upper cover and a lower cover which cooperate with the insulative body to define a receiving space therebetween for receiving the card; and
   a polarization mechanism located at the upper cover of the shell, the polarization mechanism including an elastic portion, a stop and a cutout defined between the elastic portion and the stop, the elastic portion and the stop projecting into the receiving space, wherein when the card is inserted into the connector front end first, the bevel edge of the card engages with the elastic portion to cause the elastic portion together with the stop to exit the receiving space, whereby the card can be fully inserted into the connector to enable the contacts to electrically engage with the contact pads.

8. The electrical card connector as claimed in claim 7, wherein the upper cover defines an opening, and the polarization mechanism is integrally formed from the upper cover and disposed in the opening.

9. The electrical card connector as claimed in claim 7, wherein the elastic portion of the polarization mechanism has an arcuate profile, and the stop is perpendicularly bent into the receiving space.

10. The electrical card connector as claimed in claim 7, wherein the polarization mechanism further includes a connecting arm extending from the upper cover, and the elastic portion and the stop extend from the connecting arm.

11. The electrical card connector as claimed in claim 7, wherein the polarization mechanism exerts resilient pressing force against the card when the card is fully inserted into the connector, whereby reliable electrical connection between the contacts of the connector and the contact pads of the card is ensured.

12. The electrical card connector as claimed in claim 7, wherein the polarization mechanism is formed by stamping of the upper cover of the shell.

13. An electrical card connector comprising:

an insulative body;

a plurality of contacts mounted in the insulative body;

a metal shell covering the insulative body and the contacts, thereby defining a receiving space to receive an electrical card inserted into the connector through a front end of the connector; and a polarization mechanism directly stamped from and integrally formed with the shell, said mechanism including an elastic portion and a stop, the stop being deflectable to move along with the elastic portion in a vertical direction when said elastic portion is moved in the vertical direction by an inserted, correctly oriented card, and the elastic portion being substantially located behind said stop in a front-to-back direction so that an inserted, disorientated card is obstructed by the stop rather than activate the elastic portion; wherein a cutout is formed between the elastic portion and the stop to increase elasticity of the elastic portion while still maintaining associated movability of the stop when the elastic portion is moved.

14. The connector as claimed in claim 13, wherein a push arm is moveable relative to the housing along said front-to-back direction, said push arm defines a block with thereon a bevel face positioned behind said elastic portion along said front-to-back direction.

15. The connector as claimed in claim 14, wherein said elastic portion defines an arcuate profile compliant with the bevel face.

16. The connector as claimed in claim 13, wherein said mechanism includes a fixed front end linked to the shell and an opposite rear free end away therefrom.

* * * * *